United States Patent [19]

Gluskoter et al.

[11] Patent Number: 5,656,869

[45] Date of Patent: Aug. 12, 1997

[54] METHOD AND APPARATUS TO MAINTAIN POWER USING A FAULT-TOLERANT POWER SUPPLY AND A TEMPORARY EXTERNAL POWER SUPPLY

[75] Inventors: Steven D. Gluskoter; David L. Moss, both of Austin, Tex.

[73] Assignee: Dell U.S.A. L.P., Austin, Tex.

[21] Appl. No.: 503,578

[22] Filed: Jul. 18, 1995

[51] Int. Cl.$^6$ ...................................................... H02J 7/00
[52] U.S. Cl. .............................. 307/64; 307/43; 307/44; 307/66; 307/80; 307/85
[58] Field of Search .............................. 307/43, 44, 66, 307/80, 85, 150, 64; 361/679, 601, 622, 625

[56] References Cited

U.S. PATENT DOCUMENTS

| 4,812,672 | 3/1989 | Cowan et al. | 307/64 |
| 5,428,524 | 6/1995 | Massie | 363/79 |

Primary Examiner—William M. Shoop, Jr.
Assistant Examiner—Kim Lockett
Attorney, Agent, or Firm—Stanford & Bennett

[57] ABSTRACT

A power supply system including a power supply providing power to an electronic device through current share circuitry, which includes a second connector for receiving power from an external power supply. The power supply is preferably a fault-tolerant power supply so that the electronic device receives continuous power in the event of partial failure. When the fault-tolerant power supply partially fails, the external power supply is connected to the second connector of the current share circuitry, which is switched to temporarily provide power to the electronic device from the external power supply. The power supply is then replaced while the external power supply provides power, so that power to the electronic device is continuously maintained. The electronic device thus experiences zero down-time. Even in low-end systems with a single power supply, down-time is substantially reduced. The external power supply is connected internally or through an external connector on the electronic device. In an alternative embodiment, each power supply or current share board includes a second output for serving as the external power supply to another electronic device having a partially failed power supply. The present invention is particularly advantageous for use with PC server systems, where it is desired to maintain continuous power with zero down-time.

15 Claims, 5 Drawing Sheets

METHOD AND APPARATUS TO MAINTAIN POWER USING A FAULT-TOLERANT POWER SUPPLY AND A TEMPORARY EXTERNAL POWER SUPPLY

FIELD OF THE INVENTION

The present invention relates to power supplies, and more particularly to a method and apparatus for providing continuous power to an electronic device while replacing its power supply.

DESCRIPTION OF THE RELATED ART

It is often desirable to maintain continuous power to an electronic device such as a personal computer system (PC). This is particularly true when a PC is used as a server to service other PC's or workstations. The most significant factor of server evaluation is its availability or "up-time", which means the server is powered up and operational versus powered down and non-functional. In many companies, the mount of down-time a server requires is recorded and is often the single most important factor in evaluation of that server.

It is very important, therefore, to keep a PC operational for as much time as possible. One particular method for achieving maximum up time is to provide the PC with a redundant power supply. A fully redundant power supply includes two complete and separate power supplies, where each supply is capable of running the PC should the other fail. The redundant supplies may be implemented in separate housings or both may be implemented for insertion into a single housing. Both power supplies are independently removable and replaceable, so that either supply may be removed while the other power supply is providing power without affecting PC operation. Thus, both of the power supplies are independently removable and each is capable of independently powering the PC. An automatic current sharing circuit shares current, and thus power, between the supplies. In this manner, either supply can fail without affecting PC operations. The failed supply is swapped out and replaced at any time before the second supply fails, so that the PC experiences no down-time.

The advantage of redundant power supplies is that there is rarely ever a need to power down the system to replace a failed power supply. The disadvantage is considerable cost involved with duplication of the supply, as well as a greater amount of space used within the computer system to achieve such power supply duplication.

An alternative, yet slightly less desirable solution, is a fault-tolerant power supply. A fault-tolerant power supply effectively includes two integrated supplies housed within one physical unit, both coupled through current share circuitry to the output of the supply. Thus, instead of a separate power supply package, the internal circuitry is duplicated within the same supply package and is not independently removable. Current sharing circuitry operation is similar to that of a redundant power supply, where either internal supply is capable of independently powering the PC in the event of failure of the other. This will be referred to herein as a partial failure, since the second circuitry assumes full operation upon failure of the first. System operation remains unaffected by such partial failure since power is maintained. In this case, however, the failed power circuitry cannot be removed without shutting down the PC since this would also require removal of the operating power circuitry. Once either of the internal power supplies fails, the system must eventually be shut down to replace the fault-tolerant power supply to maintain system reliability.

The advantage of the fault-tolerant power supply is that power is not removed suddenly or at an inconvenient time and allows a user or service technician to plan ahead for shutting the system down and replacing the faulty supply. This reduces down-time since the user and/or technician can plan a convenient time to shut the system down and replace the supply. Another advantage is that a fault-tolerant power supply is that it is typically smaller, less costly and consumes less physical space than a fully redundant power supply. A significant disadvantage of a fault-tolerant power supply is that the system must eventually be taken off-line to replace the partially failed supply.

It is desired to use a smaller and less expensive power supply in a server PC or other electronic device while maintaining system power to an electronic device with little or no down-time. This would save significant cost and space within the computer as compared to a fully redundant supply.

SUMMARY OF THE INVENTION

A power supply system according to the present invention includes a replaceable power supply providing power to an electronic device through current share circuitry, which includes a second input for receiving power from an external supply. In the preferred embodiment, the power supply is fault-tolerant so that the electronic device receives continuous power in the event of partial failure. When the fault-tolerant power supply partially fails, an external operating supply is connected to the second input of the current share circuitry to temporarily provide power to the electronic device. The fault-tolerant power supply may then be removed and replaced while the electronic device continues to operate. When a new operational fault-tolerant power supply is inserted and connected to the current share circuitry, the temporary external supply is removed so that power is once again provided from the fault-tolerant power supply. In this manner, the electronic device experiences zero down-time using a fault-tolerant power supply while also achieving the benefits of lower cost and smaller size of a fault-tolerant power supply as compared to a fully redundant power supply.

The present invention is particularly advantageous when a plurality of PC servers are needed. A single or a relatively small number of external power supplies are necessary to keep all PCs operational with zero down-time. Any time a fault-tolerant power supply partially falls, the external power supply is temporarily connected for maintaining power to that PC, and the partially failed fault-tolerant power supply is replaced with a fully functional unit. Even if two or more fault-tolerant supplies partially fail concurrently, there is a relatively low probability that the secondary power circuitry within a given fault-tolerant power supply will fail before all of the partially failed supplies are replaced. A service technician replaces the fault-tolerant supplies in a relatively quick manner using a single external supply. In this manner, a plurality of server systems can be maintained with zero down-time.

The present invention is desirable in low-end systems, which do not have redundant or fault-tolerant supplies. If the low-end, single power supply fails and the system goes down, it may be some time before a qualified service technician is available to replace the failed unit. In this case, the external power supply is connected to the current share circuitry to restore power temporarily until the single power supply is replaced. It is preferable to provide external access to the current share circuitry to allow a less qualified person to restore the power, if necessary. Although the electronic device does experience some down-time, the amount of down-time is minimized. The current share circuitry enables replacement of the power supply without having to power down the system again.

The current sharing circuitry preferably includes two input connectors and an output connector, where current, and thus power, is shared between the input connectors for providing power to the electronic device. During normal operation, the fault-tolerant power supply is connected into one input connector for providing power through the output connector. When the fault-tolerant power supply partially fails, an external power supply is connected to the second input connector of the current sharing board, which uses power from either or both of the supplies to maintain continuous power. Thus, current provided through the second connector is shared with current provided from the first connector, so that the fault-tolerant power supply is replaced while the external unit provides power.

In another alternative embodiment, the temporary external supply is the fault-tolerant power supply of a second PC. In this embodiment, two or more PCs include fault-tolerant power supplies and power sharing circuitry having a second output connector as well as a second input connector. A user or technician simply connects a cable from the second output connector of the share circuitry of the fully operational PC to the second input connector of a second PC with a partially failed power supply. The partially failed power supply of the second PC is then replaced as described previously while the power supply of the first PC provides power. In this manner, both PCs experience zero down-time. Alternatively, the fault-tolerant power supply itself includes a second output power connector rather than the current share board, where current share operation is similar.

The fault-tolerant power supply provides twice the power either indefinitely or for a limited period of time. The fault-tolerant power supply is preferably configured to provide dual power for a limited amount of time, such as five minutes or so, sufficient to allow replacement of a partially failed fault-tolerant power supply. It is preferable to increase the fan speed to handle increased heat generation. Of course, the fault-tolerant power supply could include circuitry to automatically increase fan speed. Although redundancy is temporarily lost during the replacement period, such replacement period is typically very short so that probability of complete failure is minimal.

It is noted that many other variations are possible and contemplated. For example, the second connector of the current sharing board can be provided internally or with access external to the PC chassis so that the cover of the PC need not be removed. The fault-tolerant power supply may also be fashioned for external removal from or insertion into the PC. For safety purposes, the external connector includes a plate or cover for covering the external connector while not being used.

A power supply system according to the present invention therefore allows the use of a less expensive and smaller power supply while also achieving low or even zero down-time for electronic devices such as PC server systems. The user thus receives the benefits of cost and space savings of a smaller power supply, while also achieving the benefits typically associated with fully redundant power supply systems.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
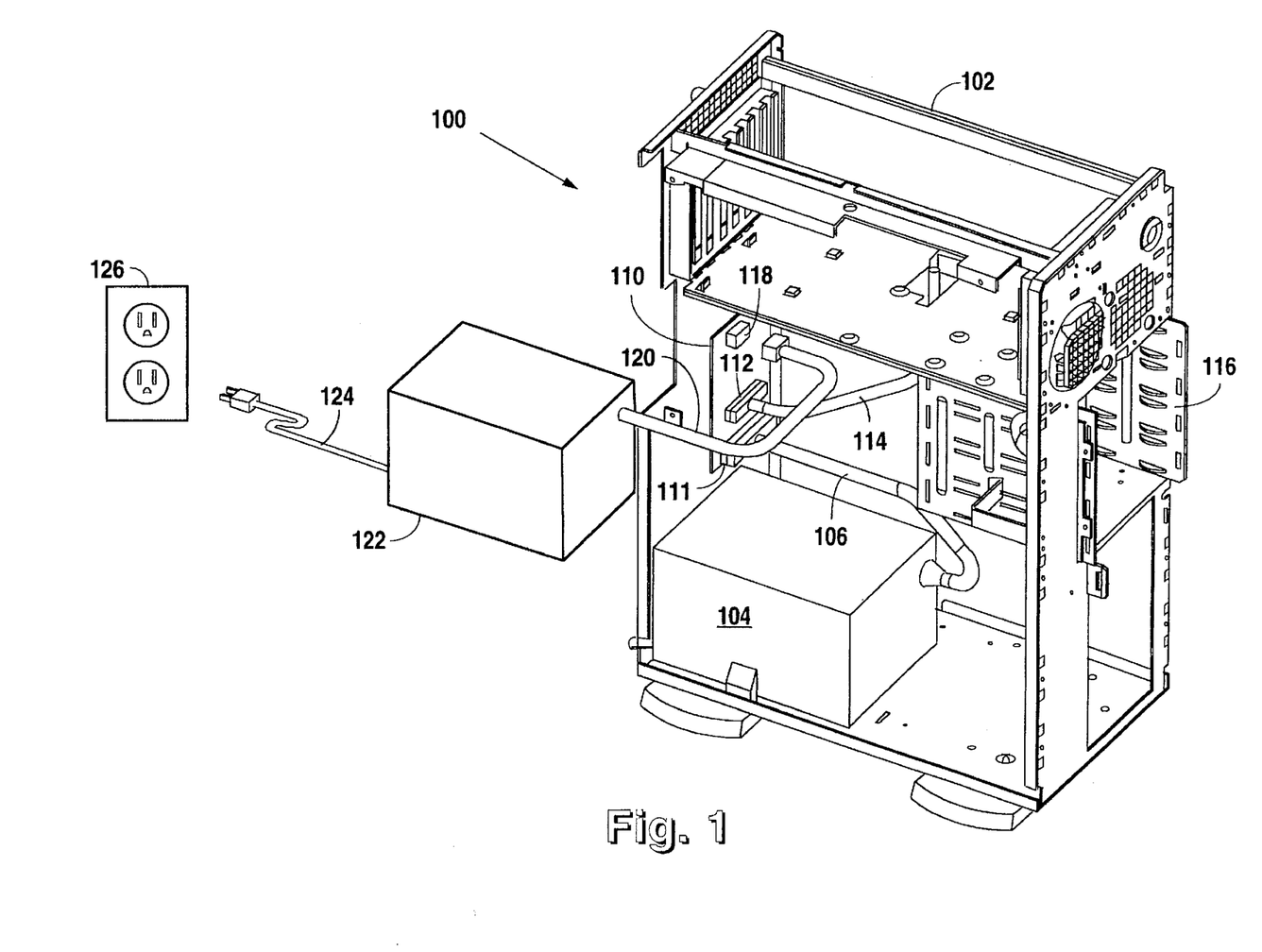
FIG. 1 is an isometric view of a computer using a power supply system according to the present invention.

Referring now to FIG. 1, a power supply system 100 according to the present invention is illustrated. A PC server system 102 is shown with its cover and most of its circuit removed for purposes of illustration. The present invention is intended for use with any type of computer system or other electronic device where it is desired to maintain continuous power. The PC 102 includes a removable fault-tolerant power supply 104 for providing power through a cable 106. The fault-tolerant power supply 104 is preferably designed for external removal, although this is not necessary for purposes of the present invention. The fault-tolerant power supply 104 includes internal redundant power circuitry coupled to internal current sharing circuitry (not shown) for sharing power or for switching from a first power circuit to a second, redundant power circuit in the event of failure of the first. When such partial failure occurs, the fault-tolerant power supply 104 continues to provide power without affecting operation of the PC 102. However, the system is less reliable during such partial failure and will experience down-time if the duplicate power circuit also fails. The fault-tolerant power supply 104 includes external indicating means (not shown), such as an LED indicator or the like, for informing the user of the partial failure.

It is noted that both internal power circuits within the fault-tolerant power supply 104 are preferably powered on and each providing power through the internal current share circuitry during normal operation. In the event of failure of one, the other immediately provides full power without power glitches.

Power from the fault-tolerant power supply 104 is provided through the cable 106 into a first input connector 111 of a current sharing board 110, which includes current share circuitry (not shown) incorporated thereon. The current sharing board 110 includes an output connector 112 for connecting to a cable 114 to provide power to circuitry 116 of the PC 102. The current sharing board 110 further includes a second input connector 118 for receiving power from an external power supply 122, typically through an external power cable 120. The external power supply 122 is connected to an AC source 126 through a plug 124 as known to those skilled in the art.

The current sharing board 110 provides power to the PC 102 from either or both of the two internal power circuitries of the fault-tolerant power supply 104, or alternatively from the external power supply 122 if connected to the second input connector 118. When power is available from the external power supply 122 to the second input connector 118, the partially failed fault-tolerant power supply 104 may be disconnected and replaced. Thus, in the event of partial failure of the fault-tolerant power supply 104, a user or technician provides the external supply 122 and connects it to the AC source 126. The external supply 122 is then activated, and the cable 120 is connected to the second connector 118 for providing power to the PC 102 through the current sharing board 110. Once the external power supply 122 is connected and activated in this manner, the user or technician disconnects and replaces the fault-tolerant power supply 104 with an operational unit. Once the replacement power supply is installed into the PC 102, it is connected to the connector 111 of the current sharing board 110 and the external supply 122 is removed. Operation of the PC 102 continues undisturbed during such replacement.

It is appreciated that the PC 102 experiences zero down-time during replacement of the fault-tolerant power supply 104. The external supply 122 temporarily provides power to the PC 102 during replacement of the fault-tolerant power supply 104. Although the external supply 122 is temporarily redundant, it need not be purchased by the user and may be provided by a service technician during the replacement.

Alternatively, a user may have a plurality of PC systems, similar to the PC 102, where only a single external supply 122 need be provided for replacing the fault-tolerant power supplies for all of the PCs. In the unlikely event that two or more fault-tolerant power supplies partially fall concurrently, the user replaces all of the partially failed fault-tolerant supplies relatively quickly with zero down-time for any of the PCs. It is very unlikely that a given fault-tolerant power supply will completely fail while a partially failed fault-tolerant power supply of another PC is being replaced. Thus, for all practical purposes, a single external power supply 122 need be provided for a plurality of PCs. It is further noted that the second connector 118 is shown located within the PC 102, where the PC cover would be removed before connecting the external supply 122.

FIG. 1 also illustrates an alternative embodiment for low-end systems, where the power supply 104 is not fault-tolerant but is merely a single power supply 104. A single power supply is even smaller and more cost efficient than a fault-tolerant power supply, but power reliability is reduced. When the power supply 104 fails in this embodiment, the PC 102 is shut down. However, a user or technician then connects the external power supply 122 to the current share board 110 as described previously and the PC 102 is once again operational. The power supply 104 is then replaced while the external power supply 122 is connected, so that the PC 102 experiences no additional down-time. Although the PC 102 does experience some down-time initially, the external power supply 122 may be connected relatively quickly thereby minimizing down-time.

Figure 2:
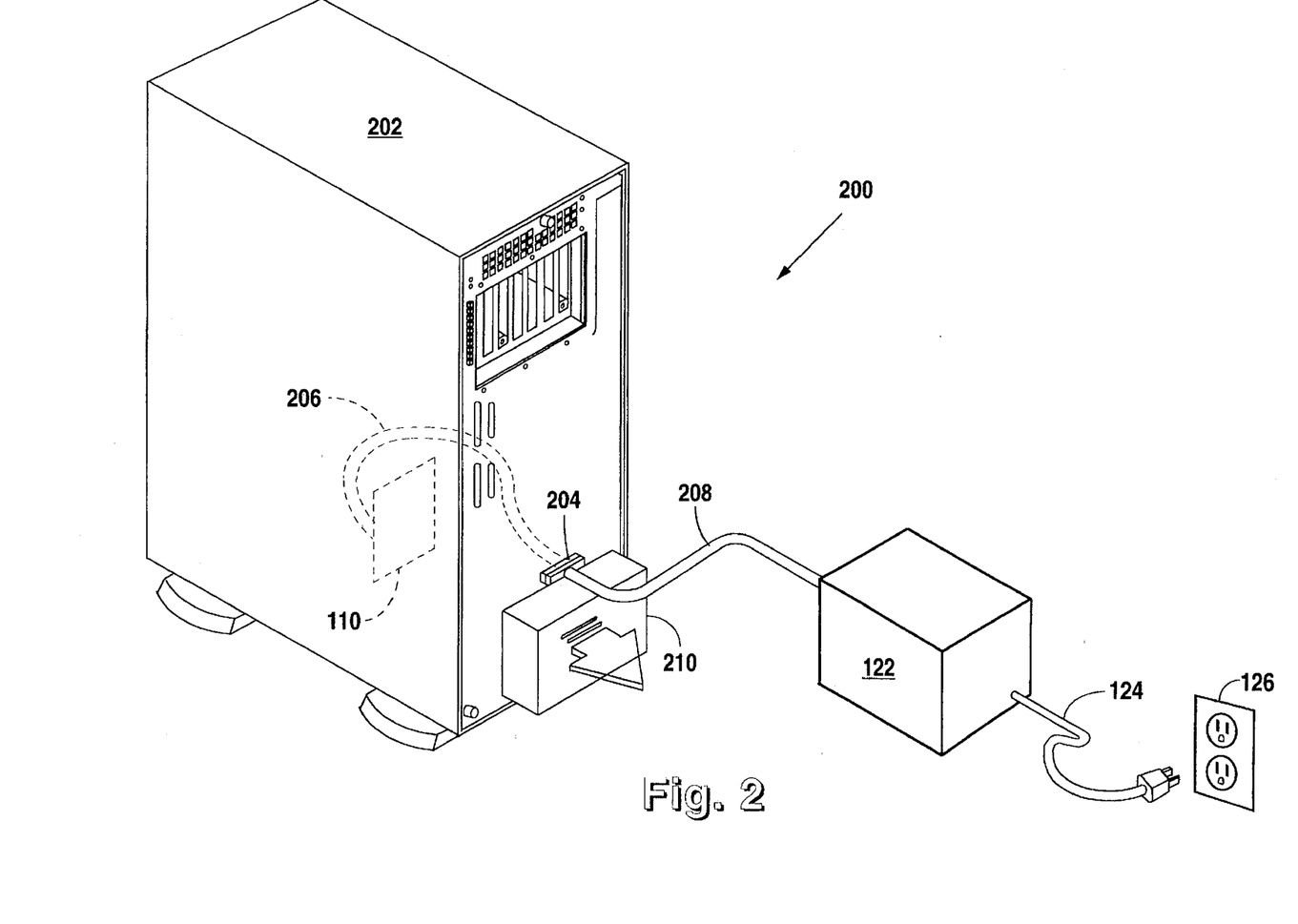
FIG. 2 is an alternative embodiment of the present invention using an external connector for connecting the external supply of FIG. 1.

Referring now to FIG. 2, an alternative power supply system 200 is illustrated. A PC system 202 is similar to the PC 102 of FIG. 1, except that it includes an external connector 204 and internal cable 206 for connecting to the internal current sharing board 110. The external supply 122 operates in a similar manner, but includes a cable 208 adapted for connecting to the external connector 204 for supplying to the current sharing board 110 in a similar manner as described previously. A fault-tolerant power supply 210 is similar to the fault-tolerant power supply 104 of FIG. 1, except it is shown as externally removable. In this manner, a user or technician replaces the fault-tolerant power supply 210 without having to remove the cover of the PC 202. When the fault-tolerant power supply 210 fails, the user provides and powers up the external supply 122 and connects it through the cable 208 to the external connector 204. The current sharing board 110 detects such connection and shares power as described previously. The fault-tolerant power supply 210 is then replaced while the server 202 remains fully operational. It is thus appreciated that the power supply system 200 operates in a similar manner as the power supply system 100, except more conveniently for allowing complete external replacement of the fault-tolerant power supply 210. Of course, the power supply 210 could alternatively be a single power supply for low-end systems, where the PC 202 would experience some, but minimal down-time.

Figure 3:
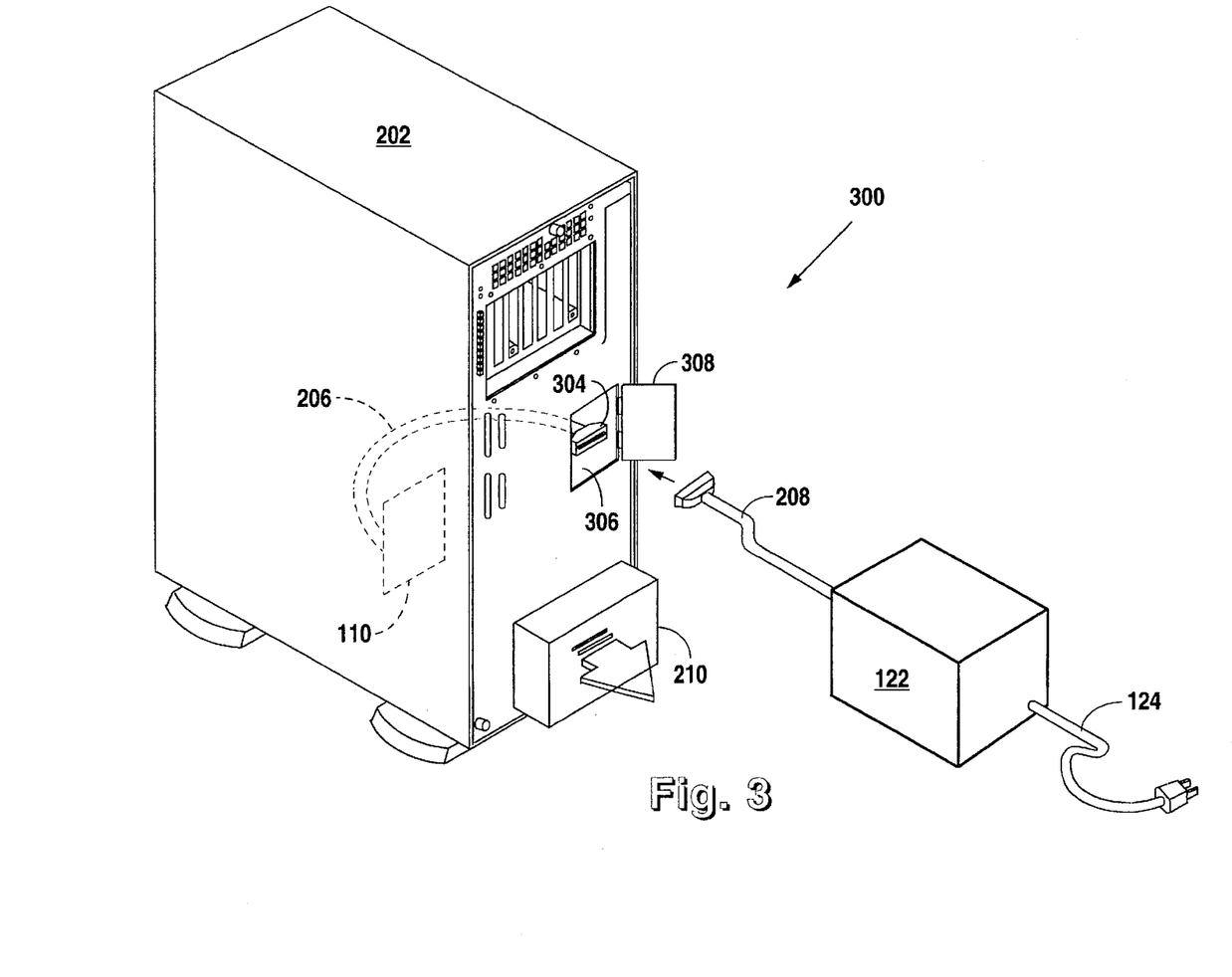
FIG. 3 illustrates an embodiment similar to FIG. 2 further including a cover for covering the external connector.

Referring now to FIG. 3, an embodiment similar to FIG. 2 is shown of a PC 302 implemented according to the present invention. The PC 302 includes a similar external connector 304 with the same internal cable 206 for connecting the external connector 304 to the current sharing board 110. In this case, however, the PC 302 includes a housing 306 with a removable or hinged cover or plate 308 for covering the external connector 304. Operation is similar to the power supply system 200, except that the cover 308 is first opened or otherwise removed for exposing the connector 304. Once the cover or plate 308 is so removed, the user can connect the external supply 122 through the cable 208 in a similar manner as described for FIG. 2. This embodiment is useful to ensure compliance with certain safety standards for externally available power receptacles.

Figure 4:
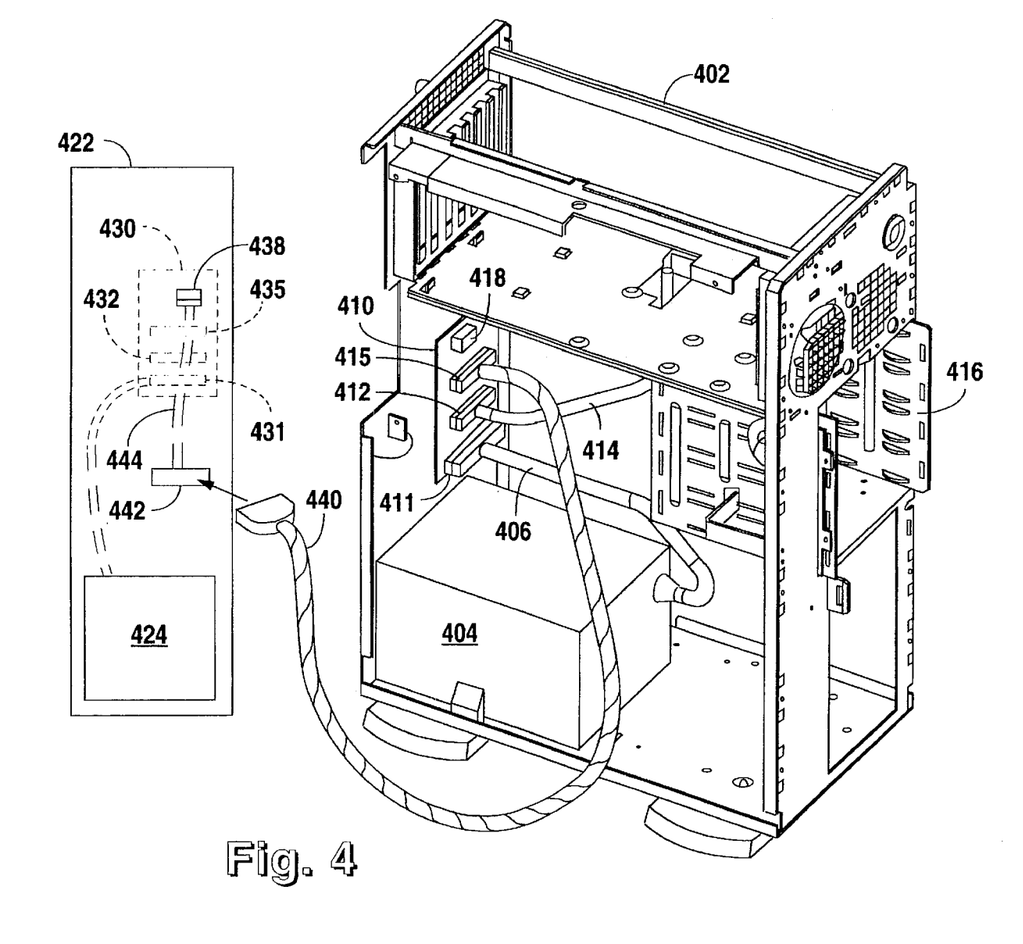
FIG. 4 is an isometric view of a power supply system according to another embodiment of the present invention.

Referring now to FIG. 4, a power supply system 400 is shown according to another alternative embodiment of the present invention. Two separate PC servers 402, 422 are each implemented according to any of the PCs 102, 202 or 302 described in FIGS. 1–3. However, the servers 402, 422 further include current share boards 410, 430, respectively, each including first and second input connectors 411, 418 and 431, 438, respectively, a first output connector 412, 432, respectively, and also a second output connector 415, 435, respectively, for providing a second source of power. An appropriate cable 440 connects between the current share boards 410 and 430 of the respective servers 402, 422. This embodiment is particularly advantageous for multiple server configurations, where a nearby server PC is used as the external power supply to replace a partially failed fault-tolerant power supply of a first server.

In the event the fault-tolerant power supply 424 of the server 422 fails, the fault-tolerant power supply 404 of the server 402 is used as the temporary external supply. One end of the cable 440 is connected to the second output connector 415 and the other end is connected either directly to the second input connector 438 of the power share board 430 of the server 422, or through an external connector 442. A cable 444 is connected to the second input connector 438 in this case. Once so connected, the fault-tolerant power supply 404 temporarily provides power to both servers 402 and 422, so that the fault-tolerant power supply 424 may be removed without power loss to the server 422. The fault-tolerant power supply 424 is then replaced while both servers 402, 422 remain fully operational. Once the fault-tolerant power supply 424 is replaced, the cable 440 is removed, and both servers 402, 422 are rendered fully operational with zero down-time.

In the embodiment shown in FIG. 4, operation is similar to that shown in FIGS. 1–3, except that a second PC is used as the temporary external power to replace a partially failed fault-tolerant power supply of a first PC. Both PCs remain fully operational with zero down-time according to the present invention. Although redundancy is temporarily lost during replacement, replacement time is typically very short so that risk of total failure is minimal.

It is noted that the fault-tolerant power supplies 404 and 424 could instead include a second output connector for providing a temporary external source of power, where the internal current share circuitry serves to share power out of both outputs. The second output connectors 415, 435 on the current share boards 402, 422, respectively, would not be necessary. Operation is essentially the same, except that the cable 440 is connected to the second output connector on the power supply 404 rather than a second output connector on the current share board 410.

The fault-tolerant supplies 404, 424 are each implemented to provide twice their normal rate of power, either indefinitely or for a limited period of time. When either of the fault-tolerant supplies 404, 424 is used as an external power supply, its internal fan is preferably increased to handle increased heat generation. Furthermore, an internal timer (not shown) is preferably implemented so that the power supply only provides secondary power for a limited amount of time. This time period would be sufficient for allowing replacement of another fault-tolerant power supply, such as five minutes, for example. Of course, any time period deemed sufficient for replacement is contemplated, as long as the power supply is designed to safely handle the dual load for that period of time.

Figure 5:
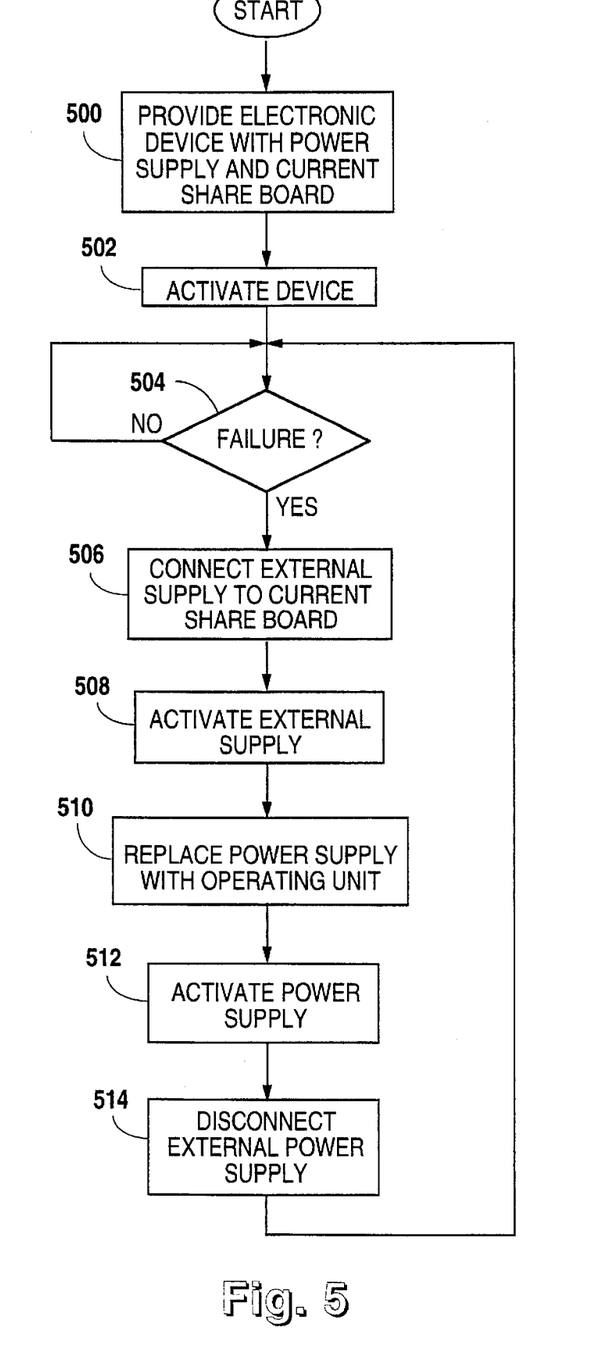
FIG. 5 is a flowchart diagram illustrating a method according to the present invention.

Referring now to FIG. 5, a flowchart diagram is shown illustrating a method according to the present invention. In a first step 500, an electronic device, such as a computer, is provided with a power supply and a current share board, as described previously. In step 502, the device is activated for normal operation. If a failure does not occur during the useful life of the device, operation remains in step 504 until power is intentionally removed. However, if a failure does occur, an external power supply is connected to the current share board of the electronic device in step 506. The external power supply is then activated in step 508, if not already activated, and power is shared automatically as described previously. The external power supply may be the fault-tolerant power supply of another PC which has a second power output. It is noted that steps 506 and 508 may be performed in either order, since in either event external power is temporarily provided to the device. In the next step 510, the failed power supply is replaced with a fully functional power supply, and the new power supply is activated, if necessary, in step 512. Then, the external power supply is disconnected in step 514. From step 514, operation proceeds back to step 504 for monitoring for another failure.

If the power supply of the electronic device is fault-tolerant, it experiences zero down-time and continues to operate, even in the event of replacement of its fault-tolerant power supply, until intentionally powered down. If a single power supply is used, down-time does occur but is kept to a minimum.

It is now appreciated that a power system according to the present invention using an external power supply and an extra input share connector allows substantial reduction or even elimination of down-time. The use of a fault-tolerant power supply achieves the benefits of a fully redundant power supply without the associated disadvantages, including increased cost and size. An external power supply temporarily connected to current share circuitry allows replacement of a partially failed power supply while maintaining continuous power to the electronic device. In the event two or more PCs are used, only a single external supply is necessary for replacing any or all partially failed fault-tolerant supplies relatively quickly. In an alternative embodiment, a second PC including a fault-tolerant power supply or current share board with a second external output can be used as the temporary external supply for replacing a partially failed fault-tolerant power supply of a first PC. In this manner, all of the PCs remain fully functional with zero down-time.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A power supply system for providing continuous power to an electronic device, comprising:
   a current share board having a first input and a second input each for receiving power and an output for providing received power to the electronic device;
   a fault-tolerant power supply having an output removably coupled to said first input of said current share board, said fault-tolerant power supply including:
   first and second internal power supply circuits, and
   an internal current share circuit coupled to said first and second internal power supply circuits for providing power at said output of said fault-tolerant power supply; and
   a temporary external power supply for coupling to said second input of said current share board for providing power to the electronic device while said fault-tolerant power supply is replaced in the event of partial failure of said fault-tolerant power supply.

2. The power supply system of claim 1, wherein the electronic device is a computer system.

3. The power supply system of claim 1, further comprising:
   an external connector provided external to the chassis of the electronic device and coupled to said second input of said current share board; and
   wherein said external power supply is coupled to said external connector for providing power to the electronic device.

4. The power supply system of claim 3, wherein said fault-tolerant power supply is externally removable from the electronic device.

5. The power supply system of claim 3, further comprising:
   a cover for covering said external connector when not being used.

6. The power supply system of claim 1 for providing continuous power to a second electronic device, further comprising:
   said current share board including a second power output so that said fault-tolerant power supply serves as said external supply for the second electronic device.

7. The power supply system of claim 1 for providing continuous power to a second electronic device, comprising:
   said fault-tolerant power supply including a second power output so that said first power supply serves as said external supply for the second electronic device.

8. A power supply system for providing continuous power, comprising:
   first and second electronic devices, each comprising:
   a current share board having a first input and a second input each for receiving power and an output for providing received power from either or both of said first and second inputs;

a fault-tolerant power supply including first and second internal power supply circuits coupled to an internal current share circuit having first and second outputs wherein said first output is removably coupled to said first input of said current share board; and a secondary output power connector coupled to said second output of said fault-tolerant power supply for providing external power from said fault-tolerant power supply;

wherein said secondary output power connector of said first electronic device is coupled to said second input of said current share board of said second electronic device to provide power while said fault-tolerant power supply of said second electronic device is disconnected.

9. The power supply system of claim 8, wherein said first and second electronic devices are computer systems.

10. The power supply system of claim 8, wherein said secondary output power connector is provided on said current share board.

11. The power supply system of claim 8, wherein said secondary output power connector is provided on said fault-tolerant power supply.

12. A method of providing continuous power to an electronic device including a fault-tolerant power supply, the fault-tolerant power supply including two internal power supply circuits coupled to an internal current share circuit having an output, the output of the internal share circuit being removeably coupled to a current share board, comprising the steps of:

connecting an external power supply to the current share board for providing power to the electronic device in the event of partial failure of the fault-tolerant power supply;

disconnecting and replacing the partially failed fault-tolerant power supply with a fully functional fault-tolerant power supply;

connecting the fully functional fault-tolerant power supply to the current share board; and disconnecting the external power supply.

13. The method of claim 12, after said step of connecting an external power supply to the current share board, further comprising the step of:

sharing power between the external power supply and the partially failed fault-tolerant power supply.

14. The method of claim 12, after said step of connecting the fully functional fault-tolerant power supply to the power share board, further comprising the step of:

sharing power between the external power supply and the fully functional fault-tolerant power supply.

15. The method of claim 12 for providing continuous power to at least two electronic devices, wherein the current share board of each electronic device includes a second power output, wherein said step of connecting an external power supply to the power share board comprises the step of:

connecting the second power output of a current share board of a first electronic device to the current share board of a second electronic device having a partially failed fault-tolerant power supply.

* * * * *